United States Patent
Lumezanu et al.

(10) Patent No.: US 12,242,542 B2
(45) Date of Patent: Mar. 4, 2025

(54) ORDINAL TIME SERIES CLASSIFICATION WITH MISSING INFORMATION

(71) Applicant: NEC Laboratories America, Inc., Princeton, NJ (US)

(72) Inventors: Cristian Lumezanu, Princeton Junction, NJ (US); Yuncong Chen, Plainsboro, NJ (US); Takehiko Mizoguchi, West Windsor, NJ (US); Dongjin Song, Princeton, NJ (US); Haifeng Chen, West Windsor, NJ (US); Jurijs Nazarovs, Madison, WI (US)

(73) Assignee: NEC Corporation, Tokyo (JP)

( * ) Notice: Subject to any disclaimer, the term of this patent is extended or adjusted under 35 U.S.C. 154(b) by 843 days.

(21) Appl. No.: 17/408,852

(22) Filed: Aug. 23, 2021

(65) Prior Publication Data
US 2022/0075822 A1   Mar. 10, 2022

Related U.S. Application Data

(60) Provisional application No. 63/075,859, filed on Sep. 9, 2020.

(51) Int. Cl.
G06F 16/906   (2019.01)

(52) U.S. Cl.
CPC ................... G06F 16/906 (2019.01)

(58) Field of Classification Search
CPC ................................ G06F 16/906
See application file for complete search history.

(56) References Cited

U.S. PATENT DOCUMENTS

| | | | |
|---|---|---|---|
| 10,489,457 B1* | 11/2019 | Wulf | G06F 16/285 |
| 11,675,926 B2* | 6/2023 | Muffat | G06F 18/23213 707/827 |
| 2019/0325060 A1* | 10/2019 | Fenoglio | G06F 16/906 |
| 2019/0354809 A1* | 11/2019 | Ralhan | G06F 16/116 |
| 2020/0317365 A1* | 10/2020 | Sherry | G06N 7/01 |

(Continued)

OTHER PUBLICATIONS

Song, Dongjin, et al. "Deep r-th root of rank supervised joint binary embedding for multivariate time series retrieval", InProceedings of the 24th ACM SIGKDD International Conference on Knowledge Discovery & Data Mining. Jul. 19, 2018, pp. 2229-2238.

(Continued)

*Primary Examiner* — David E Choi
(74) *Attorney, Agent, or Firm* — Joseph Kolodka

(57) ABSTRACT

A method classifies missing labels. The method computes, using a neural network model trained on training data, rank-based statistics of a feature of a time series segment to attempt to select two candidate labels from the training data that the segment most likely belongs to. The method classifies the segment using k-NN-based classification applied to the training data, responsive to the two candidate labels being present in the training data. The method classifies the segment by hypothesis testing, responsive to only one candidate label being present in the training data. The method classifies the segment into a class with higher values of the rank-based statistics from among a plurality of classes with different values of the rank-based statistics, responsive to no candidate labels being present in the training data. The method corrects a prediction by an applicable one of the classifying steps by majority voting with time windows.

20 Claims, 5 Drawing Sheets

(56) References Cited

U.S. PATENT DOCUMENTS

| | | | |
|---|---|---|---|
| 2020/0409339 A1* | 12/2020 | Arashanipalai | G06F 16/906 |
| 2021/0235293 A1* | 7/2021 | Chen | H04B 17/318 |
| 2021/0294818 A1* | 9/2021 | Savalle | H04L 41/5009 |
| 2022/0070537 A1* | 3/2022 | Younessian | H04N 21/4662 |
| 2022/0070975 A1* | 3/2022 | Chen | H04W 12/79 |
| 2022/0075822 A1* | 3/2022 | Lumezanu | G06F 16/906 |

OTHER PUBLICATIONS

Diaz, Raul, et al. "Soft labels for ordinal regression", InProceedings of the IEEE/CVF Conference on Computer Vision and Pattern Recognition. Jun. 2019, pp. 4738-4747.

Wu, Peter, et al.. "Ordinal Triplet Loss: Investigating Sleepiness Detection from Speech", In Interspeech 2019. Sep. 2019, pp. 2403-2407.

* cited by examiner

ORDINAL TIME SERIES CLASSIFICATION WITH MISSING INFORMATION

RELATED APPLICATION INFORMATION

This application claims priority to U.S. Provisional Patent Application No. 63/075,859, filed on Sep. 9, 2020, incorporated herein by reference in its entirety.

BACKGROUND

Technical Field

The present invention relates to information processing and more particularly to ordinal time series classification with missing information.

Description of the Related Art

Ordinal time series is data collected over time, from one or more sources, and whose labels (also called classes) form an ordinal relationship. For example, the progression of operational states in a power plant, e.g., shutdown, bootstrap, partial load, and full load, forms an ordered set of labels. Similarly, labels assigned to air quality index measurements over time (e.g., good, moderate, sensitive, unhealthy, very unhealthy, hazardous) are ordered. Unlike regression problems, whose goal is to infer a target value from a continuous space, given known past information, ordered classification works in a discrete non-uniform label space (i.e., we have a limited set of labels and a non-linear function defining the distance between them). Given a historical set of time series associated with labels and a set of possible labels that have an order relationship between them, there is a need to accurately classify new time series segments into one of the existing labels, regardless of whether the target label has appeared in the historical data or not.

SUMMARY

According to aspects of the present invention, a computer-implemented method is provided for time series classification of missing labels. The method includes extracting a feature of an incoming time series segment to be classified during an inference stage. The method further includes computing, by a hardware processor using a neural network model trained on training data, rank-based statistics of the feature to attempt to select two candidate labels from the training data that the incoming time series segment most likely belongs to. The method also includes classifying the incoming time series segment using k-NN-based classification applied to the training data, responsive to the two candidate labels being present in the training data. The method additionally includes classifying the incoming time series segment by hypothesis testing, responsive to only one of the two candidate labels being present in the training data. The method further includes classifying the incoming time series segment into a class with higher values of the rank-based statistics from among a plurality of classes with different values of the rank-based statistics, responsive to none of the two candidate labels being present in the training data. The method also includes correcting a prediction by an applicable one of the classifying steps by majority voting with time windows.

According to other aspects of the present invention, a computer program product is provided for time series classification of missing labels. The computer program product includes a non-transitory computer readable storage medium having program instructions embodied therewith. The program instructions are executable by a computer to cause the computer to perform a method. The method includes extracting, by a hardware processor, a feature of an incoming time series segment to be classified during an inference stage. The method further includes computing, by the hardware processor using a neural network model trained on training data, rank-based statistics of the feature to attempt to select two candidate labels from the training data that the incoming time series segment most likely belongs to. The method also includes classifying, by the hardware processor, the incoming time series segment using k-NN-based classification applied to the training data, responsive to the two candidate labels being present in the training data. The method additionally includes classifying the incoming time series segment by hypothesis testing, responsive to only one of the two candidate labels being present in the training data. The method further includes classifying the incoming time series segment into a class with higher values of the rank-based statistics from among a plurality of classes with different values of the rank-based statistics, responsive to none of the two candidate labels being present in the training data. The method also includes correcting a prediction by an applicable one of the classifying steps by majority voting with time windows.

According to yet other aspects of the present invention, a computer processing system is provided for time series classification of missing labels. The computer processing system includes a memory device for storing program code. The computer processing system further includes a hardware processor operatively coupled to the memory device for storing the program code to extract a feature of an incoming time series segment to be classified during an inference stage. The hardware processor further runs the program code to compute, using a neural network model trained on training data, rank-based statistics of the feature to attempt to select two candidate labels from the training data that the incoming time series segment most likely belongs to. The hardware processor also runs the program code to classify the incoming time series segment using k-NN-based classification applied to the training data, responsive to the two candidate labels being present in the training data. The hardware processor additionally runs the program code to classify the incoming time series segment by hypothesis testing, responsive to only one of the two candidate labels being present in the training data. The hardware processor further runs the program code to classify the incoming time series segment into a class with higher values of the rank-based statistics from among a plurality of classes with different values of the rank-based statistics, responsive to none of the two candidate labels being present in the training data. The hardware processor also runs the program code to correct a prediction by an applicable one of the classifying steps by majority voting with time windows.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention are directed to ordinal time series classification with missing information.

Embodiments of the present invention propose a framework for ordinal time series classification. The framework relies on a temporal encoder that converts raw time series data segments into low-dimensional representations (also called embeddings or features). The following two inventions are proposed on top of the temporal encoder: an ordinal optimization module; and an ordinal retrieval-based classification module.

Ordinal optimization module: In embodiments of the present invention, it is proposed to learn time series representations using a novel ordinal quadruplet loss optimization. The loss attempts, at the same time, to compute representations of input time series that discriminate across different labels while maintaining the order between labels. This means that, for any label A, the distances to other labels (known a priori) are correlated with the distances between the representations of the time series segments in A and those of the time series from other labels.

Ordinal retrieval-based classification module that enables imputation of missing training labels. In general, knn-based retrieval is used for classification in metric learning problems: a time series segment is classified according to the label of the majority among k of its closest neighbors, according to an embedding (or representation) distance to them. However, when labels are missing from the training data, this method does not work anymore: samples belonging to the missing class are wrongly classified as one of the non-missing classes. To avoid this, correlation-based retrieval is proposed, which is a novel retrieval mechanism that computes a retrieval vector for every label (missing and non-missing) as well as for each testing sample to be classified. A sample will be assigned to the label with the most similar retrieval vector.

Figure 1:
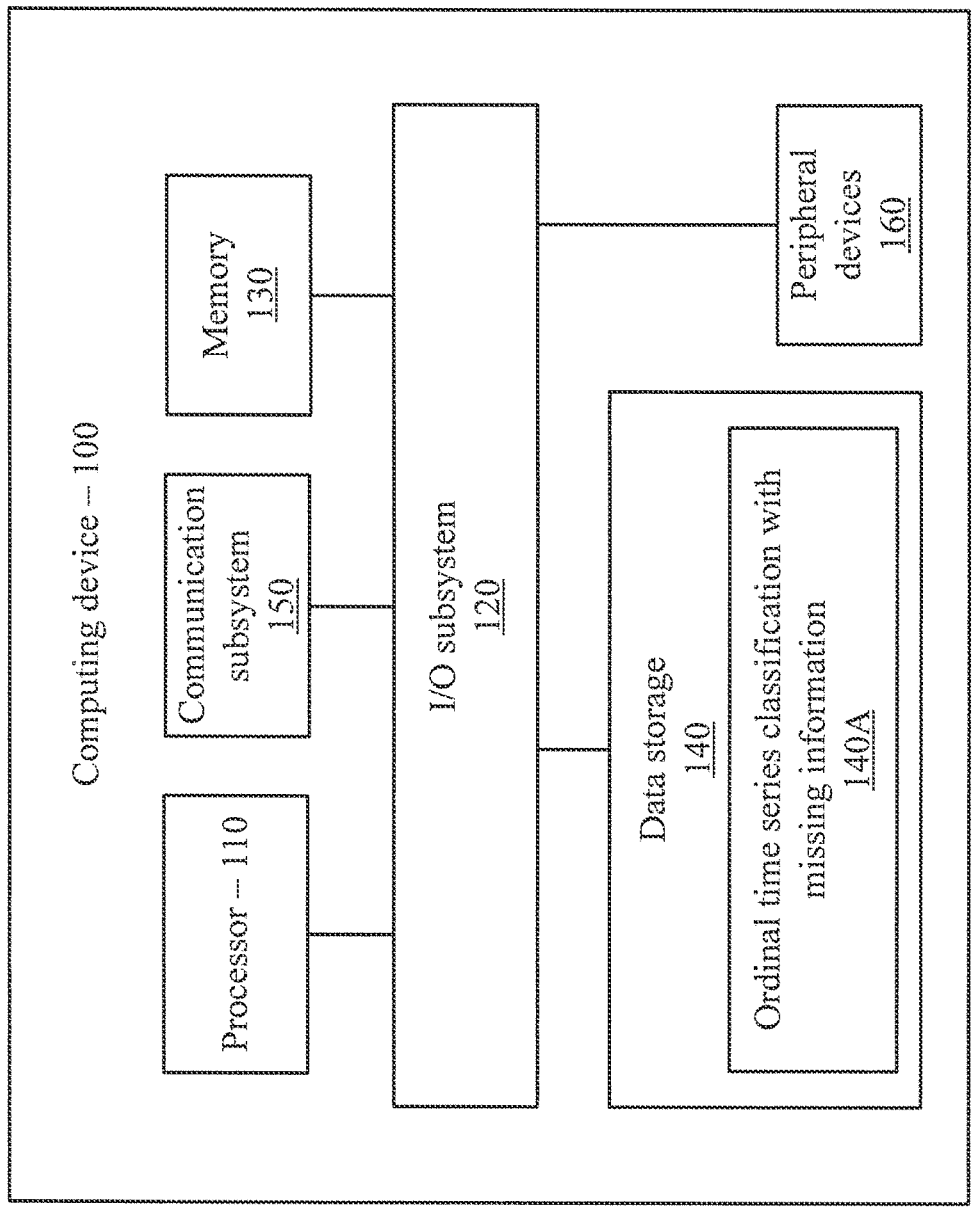
FIG. 1 is a block diagram showing an exemplary computing device, in accordance with an embodiment of the present invention.

Thus, two inventive features contribute to solving the problem as follows:
(1) A formulation for loss function when learning the best features for time series data. The loss relies on existing triplet and log ratio loss formulations but provides a not previously seen solution to recovering order from the label space and using it to constrain the learned feature space
(2) A method for classifying time series from labels (or classes) that were not used to train the encoder that generates the features FIG. 1 is a block diagram showing an exemplary computing device 100, in accordance with an embodiment of the present invention. The computing device 100 is configured to perform ordinal time series classification with missing information.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for ordinal time series classification with missing information. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
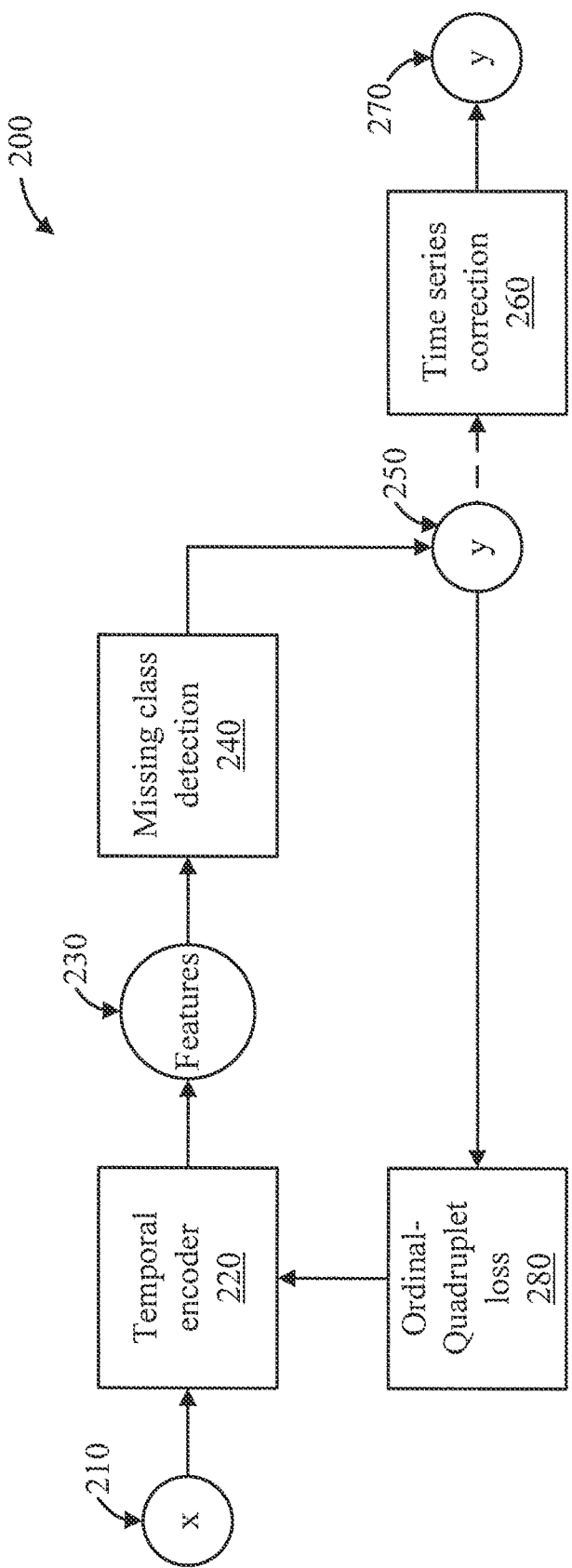
FIG. 2 is a block diagram showing an exemplary ordinary time series classification architecture, in accordance with an embodiment of the present invention.

These and other variations of a hardware processor subsystem are also contemplated in accordance with embodiments of the present invention FIG. 2 is a block diagram showing an exemplary ordinary time series classification architecture 200, in accordance with an embodiment of the present invention.

An input time series data is split into (potentially overlapping) segments. A segment represents all readings from all sensors in a short continuous period of time. A temporal encoder 220 computes an embedding for each time series segment 210 by using a deep neural network. It optimizes the weights of the network by minimizing the novel ordinal quadruplet loss function 280. When classifying a new segment, we pass the segment through the encoder 220 to compute a feature 230 and compare the feature 230 with those of historical segments used in training. A missing class detection module 240 computes a class (or label) 250 for the new segment, even when the true class 290 of the segment is missing from the training data. Finally, if we know that labels do not change often, we can perform time series correction 260 to revise predicted classes 270 over a recent continuous window of testing data.

This framework can be incorporated into any complex system that generates time series data, regardless of the number of sensors and the frequency of data generation.

A further description will be given regarding the temporal encoder 220, in accordance with an embodiment of the present invention.

A temporal encoder based on LSTM is used to compute features for time series segments. The input of the encoder is a slice through the time series (i.e., all values recorded during a limited continuous period of time from all sensors in the system). The encoder computes a vector in a low-dimensional Euclidean space (also called feature, embedding, or representation) for each input time series segment by minimizing the ordinal-quadruplet loss function.

A description will now be given regarding the ordinal quadruplet loss 280, in accordance with an embodiment of the present invention.

To build a learning framework that is robust against missing labels from the training data, the following aspects have to be accounted for during optimization:

(a) (similarity) Similar time series segments (i.e., with the same label) should have features that are close to each other (b) (discrimination) Non-similar time series segments (i.e., with different labels) should have features that are far from each other (c) (order) Segments of different classes should have features whose order in the feature space matches that of the labels of the segments We propose the ordinal quadruplet loss to meet all three of the above properties, as follows:

Given four time series segments, a, s, i, and j, where a and s are part of the same class (or label) and i and j are part of classes different from each other and from the class of a, the ordinal quadruplet loss is composed of three different losses:

$$L_{a,s,i,j} = LT_{a,s,i,f} + LT_{a,s,j,f} + LR_{a,i,j,f,y}$$

where $$LT_{as,i,f} = [D(f_a, f_s) - D(f_a, f_i) + \delta]_+$$

$$LT_{as,j,f} = [D(f_a, f_s) - D(f_a, f_j) + \delta]_+$$

$$LR_{a,i,j,f,y} = \left\{ \log \frac{D(f_a, f_i)}{D(f_a, f_j)} - \log \frac{D_y(y_a, y_i)}{D_y(y_a, y_j)} \right\}^2$$

LT represents a triplet loss that attempts to minimize the distance between features of segments in the same class ($f_a$ and $f_s$) and maximize the distance between features of segments in different classes ($f_a$ and $f_i$ or $f_3$). The two triplet losses maintain the similarity and discrimination properties above.

LR represents a log ratio loss that tries to make the ratio of feature distances for any three segments in different classes similar to the ratio of label distances of the same segments. In the formulation of the log ratio loss, $D_y$ represents a label distance function defined by the user and $y_i$ is used to indicate the true label for segment i.

A description will now be given regarding missing class detection, in accordance with an embodiment of the present invention.

Correlation-based retrieval is proposed to classify time series whose label was not present in the training data (missing labels). The method of the present invention can include the following steps:
(a) Label distance computation: for each label (missing and non-missing) compute a label retrieval vector from the label distance to each non-missing label (this step could be done once, before training, as the label distance is known a priori and does not change)
(b) For each incoming time series segment to be classified, compute a test retrieval vector from the Euclidean distance to the feature center of each non-missing label. The feature center of a label is defined as the average of the features of all the time series segments with that label.
(c) Compare the test retrieval vector with all label retrieval vectors (using an existing rank correlation method) and choose the two most correlated label retrieval vectors using. The labels associated with these vectors are the candidate labels. There are the following three possibilities:
(i) Both candidate labels are present in the training data: knn-based classification is performed in which the k nearest training samples are computed from the testing data and the majority class over them is taken to be the class of the testing data.
(ii) Both candidate labels are missing from the training data: The label whose retrieval vector is most correlated with the test retrieval vector is chosen.
(iii) One label is present and the other is missing from the training data: Hypothesis testing is performed as described below.
(d) Hypothesis testing is performed when one of the two candidate labels is missing. Statistical methods are used to test whether a testing sample is an outlier for the non-missing class. If it is not, then it is classified as the non-missing class; if it is, then it is classified as the missing class. To test whether the testing sample is an outlier for the non-missing class, the distribution of distances from every training data in the non-missing class to the center of the class (defined above) is computed and a quantile threshold is defined for the class. If the distance from the test data to the center is larger than the quantile threshold, the test data is an outlier.

A description will now be given regarding time series correction, in accordance with an embodiment of the present invention.

The classification accuracy can be improved even more if assumptions are made about how the time series labels change. Specifically, if it is assumed that the label does not change over a continuous window of time, all predictions for all data in the window can be used to compute a unique prediction. We then go back to all predictions in the window and revise them according to the corrected prediction. A simple way to compute a unique prediction at the end of a window is majority voting: pick the class that was predicted the most throughout the window.

Figure 3:
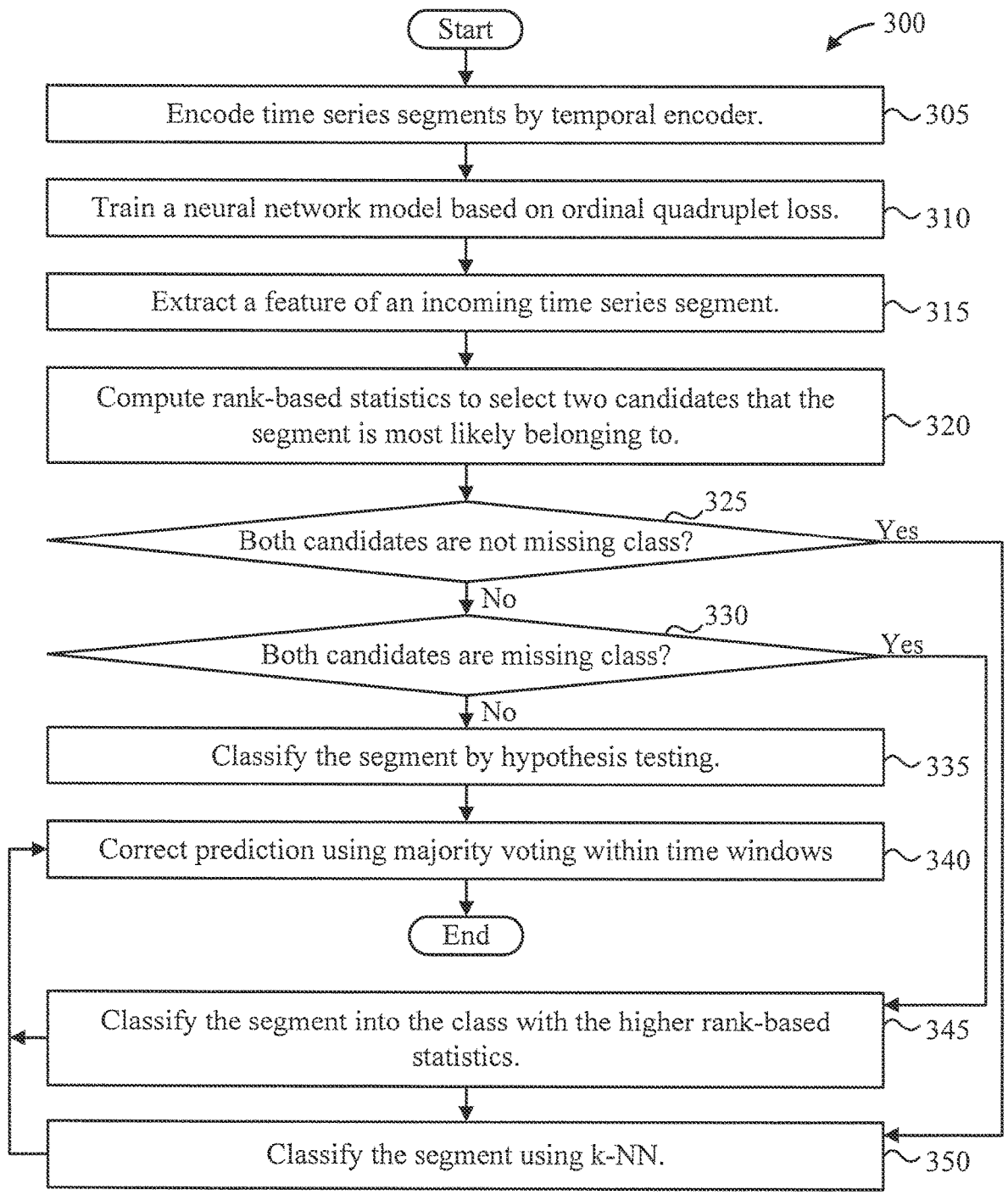
FIG. 3 is a flow diagram showing an exemplary method for ordinal time series classification with missing information, in accordance with an embodiment of the present invention.

FIG. 3 is a flow diagram showing an exemplary method 300 for ordinal time series classification with missing information, in accordance with an embodiment of the present invention.

At block 305, encode time series segments by a temporal encoder.

At block 310, train a neural network model based on ordinal quadruplet loss.

At block 315, extract a feature of an incoming time series segment.

At block 320, compute rank-based statistics to select two candidates that the segment is most likely belonging to.

At block 325, determine whether both candidates are not missing class (labels). If so, then proceed to block 350. Otherwise, proceed to block 330.

At block 330, determine whether both candidates are missing class (labels). If so, then proceed to block 345. Otherwise, proceed to block 335.

At block 335, classify the segment by hypothesis testing.

At block 340, correct prediction using majority voting within time windows.

At block 345, classify the segment into the class with the higher rank-based statistics.

At block 350, classify the segment using k-NN.

Figure 4:
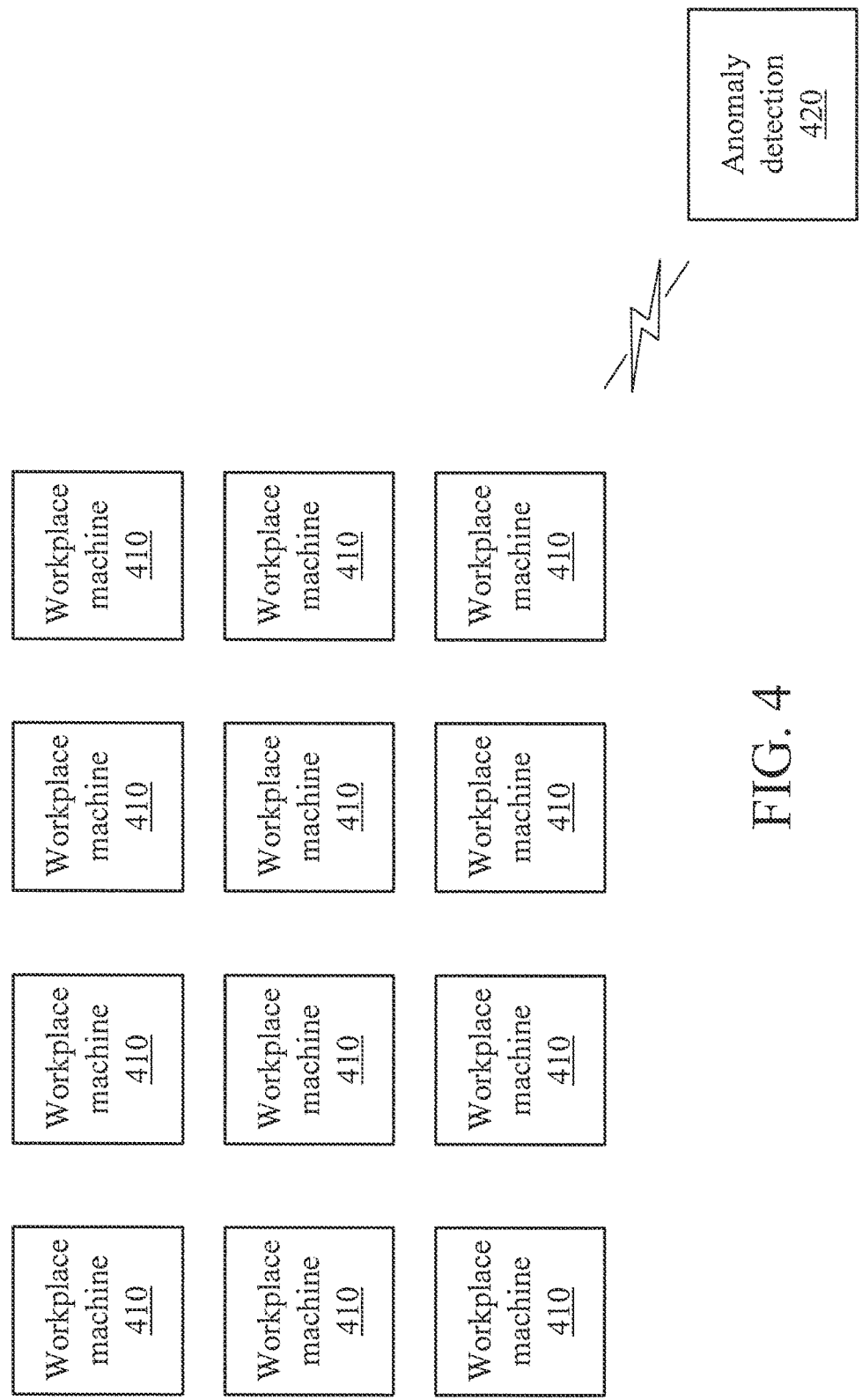
FIG. 4 is a block diagram showing an exemplary environment, in accordance with an embodiment of the present invention.

FIG. 4 is a block diagram showing an exemplary environment 400, in accordance with an embodiment of the present invention.

The environment 400 employs anomaly detection 420 and includes a plurality of workplace machines (hereinafter "machines") 410 on a factory floor. The machines 410 can be processor-based machines having safety features such as saws with guards. The machines 410 can be robots for building or assembling various items. Time series data from the machines 410 is evaluated in accordance with the present invention to put labels on the data including, where applicable, labels indicative of an impending failure. In such a case, in an embodiment, a replacement machine can be deployed in place of an impending failing machine in order to avoid factory downtime. In another embodiment, a workload of an impending failing machine can be reduced to avoid a failure, with the balance of the workload distributed amongst other machines that have additional workload capacity. Control of failure avoidance measures can be from anomaly detection block 420, which stores various failure scenarios for comparison to current events (as pert the time series data) and failure recovery and/or avoidance routines for the failure scenarios. Anomaly detection block 420 can be in wired or wireless communication with each of the machines 410. These and other techniques to avoid factory downtime can be employed.

A further description will now be given regarding various aspects of the present invention, in accordance with an embodiment of the present invention.

The present invention proposes a framework for ordinal time series classification, which is robust against missing labels from the training data. First, new ordinal-quadruplet loss is introduced to preserve order of distances in feature space same as in label space. Second, a correlation-based retrieval method is proposed to classify time series whose label was not present in the training data (missing labels).

A description will now be given regarding a problem statement and goals, in accordance with an embodiment of the present invention.

Consider a multivariate time-series classification problem with more than three classes. A common approach for classification is to learn low-dimensional representations for time series segments by applying a temporal encoder that optimizes a metric loss function (e.g., the triplet loss). The encoder projects the time series into a feature (or embedding) space where similar data is clustered together, while dissimilar segments are far apart. To classify new data, we extract its representation and predict its class using the k-nearest neighbors (knn) from the embeddings of the training data.

Unlike previous time series classification problems, two additional assumptions as imposed: (ordering) there is a total ordering relationship among the classes and (missing information) some classes may not have any samples in the training data. To understand the challenges, a focus is made on the following three classes: $\Delta$, O, and +. Assume that during training, data corresponding to O is not available, and it is learned to discriminate features based on two classes: $\Delta$ and +. This leads to a biased prediction: even if the true label of a testing sample is O, only $\Delta$ or + are capable of being predicted.

A naive solution, when knowing the complete set of labels and their order, is to interpolate the center of a missing class in feature space f(•) as a middle point between the centers of its neighbors:

$$f_o := \frac{1}{2} f_\Delta + \frac{1}{2} f_+,$$

where $f_\Delta$, $f_+$ denote the average of features for samples with labels $\Delta$ and +. For new data, the class with closest center is assigned as follows: $f_O$, $f_\Delta$, or $f_+$. There are several issues with interpolation. First, it assumes that the center of the features of missing class $f_O$, is in the middle of the interval between centers of features for known labels ($\Delta$, +): $\bar{f}_\Delta$ and $\bar{f}_+$. Second, assigning labels based on the center of features does not account for the variation of features for each label (e.g., some classes have samples with features spread apart, others close together). Third, if the boundary class (e.g., $\Delta$ or a +, in our case) or if multiple consecutive classes are missing, it is not clear how to interpolate.

Thus, it is sought to learn a feature space that preserves information about the label order. This is done by ensuring that distances between features are proportional to those between their associated labels. Such regularization implicitly limits the distance in the feature space from missing classes to its neighbors and gives us a search radius to perform post-training inference.

A further description will now be given of the method of the present invention, in accordance with an embodiment of the present invention.

Herein, it is proposed an innovative framework for ordinal classification of time-series, which enables imputation of missing labels with high accuracy. The framework includes two parts (FIG. 2): first, a new loss is proposed to preserve order of distances between classes in feature space similar to label space; second, an ordinal retrieval-based classification module is provided to make prediction for missing classes.

A description will now be given regarding preserving order of distances: ordinal-quadruplet loss.

To build an encoder robust against missing information, it should learn features which: (1) have small inter distances, i.e., for samples with same class it extracts nearby features; (2) have large intra distances, i.e., samples with different classes have features apart from each other; and (3) maintain the ordinal relation, i.e., distances between features of samples with different classes preserves same order as distance in label space.

While the first two requirements can be achieved with using triplet loss, the third can be accomplished by applying log-ratio loss. However, compare to traditional triplet loss, log-ratio loss does not take into account positive samples, with the same label as anchor. This prevents model from decreasing inter distance between classes in feature space. To address this issue, additional terms are proposed in the loss based on triplet loss and ordinal-quadruplet loss is presented.

For a quadruplet sample, (a, s, i, j), with labels y, such that $y_a = y_s$ and $y_i \neq y_a$, $y_j \neq y_a$, and learned latent representation f, ordinal-quadruplet loss is defined as:

$$L = l_t(a,s,i) + l_t(a,s,j) + l_{tr}(a,i,j), \text{ where}$$

$$l_t(a, p, n) = [D(f_a, f_p) - D(f_a, f_n) + \delta]_+,$$

$$l_{tr}(a, i, j) = \left\{ \log \frac{D(f_a, f_i)}{D(f_a, f_j)} - \log \frac{D_y(y_a, y_i)}{D_y(y_a, y_j)} \right\}^2 \text{ and}$$

$$D(i, j) = \|i - j\|_2^2$$

Ordinal relation is defined by $D_y$ (•,•) can be as simple as $D_y(y_a, y_j) = |y_a - y_j|$ or based on prior knowledge about the data.

A description will now be given regarding an ordinal retrieval-based classification module, in accordance with an embodiment of the present invention.

Selection of most similar classes. When dealing with missing information, it is not sufficient to make decisions purely based on minimal distance. Since the inventive loss preserves ranking of distances between classes in feature space, to find the most similar class for a testing sample, it is proposed to use rank-based statistics, like Spearman's $\rho$, Kendall's T, Goodman and Kruskal's Y, and Somers' D. Since the decision is based on domain of classes, it is possible for a testing sample to be classified as one of the missing classes. However, selecting the most correlated class from the domain as a prediction does not always work if sample corresponds to a missing class. Consider FIG. 5 (right), for a specific $D_y$, missing class O has a tie in order. It would not be the problem, if we have a perfect encoder, which generates features: D ($f(x^{te})$, $\bar{f}_\Delta$)=D ($f(x^{te})$, $\bar{f}_+$). In practice the usual situation is either D ($f(x^{te})$, $\bar{f}_\Delta$)>D ($f(x^{te})$, $\bar{f}_+$) or opposite, which results in order (2,1) or (1,2), respectively. Having more than two classes in training data might provide enough information about order of distances for later classes for rank-based statistics to assign a right label. It is important to notice that even if the most correlated class is a wrong one and does not correspond to a missing class, then the second most correlated class is a right one. Based on this observation we propose the following algorithm:

Notation:
S: domain of all classes
N: set of non-missing classes presented in training data
$D_y(i, j)$: function defining ordinal relation between classes i and j
$x^{tr}$ is sample from training set $\overline{f}_c := \text{mean}\{f(x_i^{tr}), \forall i: y(x_i^{tr}) = c\}$ Compute distance matrix $L = \{D_y(i,j), \forall i \in S, \forall j \in N\}$.

For testing sample $x^{te}$, compute distance to average feature of every class in N: $F := \{D(f(x^{te}), \overline{f}_c), \forall c \in N\}$ Compute rank-based statistics between F and $L_i$, (row of the matrix L corresponding to class i) for $i \in S$. Select two classes $s_1, s_2 \in S$ with the highest value of statistics.

If both $s_1, s_2 \in N$, i.e., both are non-missing classes, then we predict class using knn If none of selected classes are in N, i.e., both classes are missing, then we chose the one with highest correlation.

Figure 5:
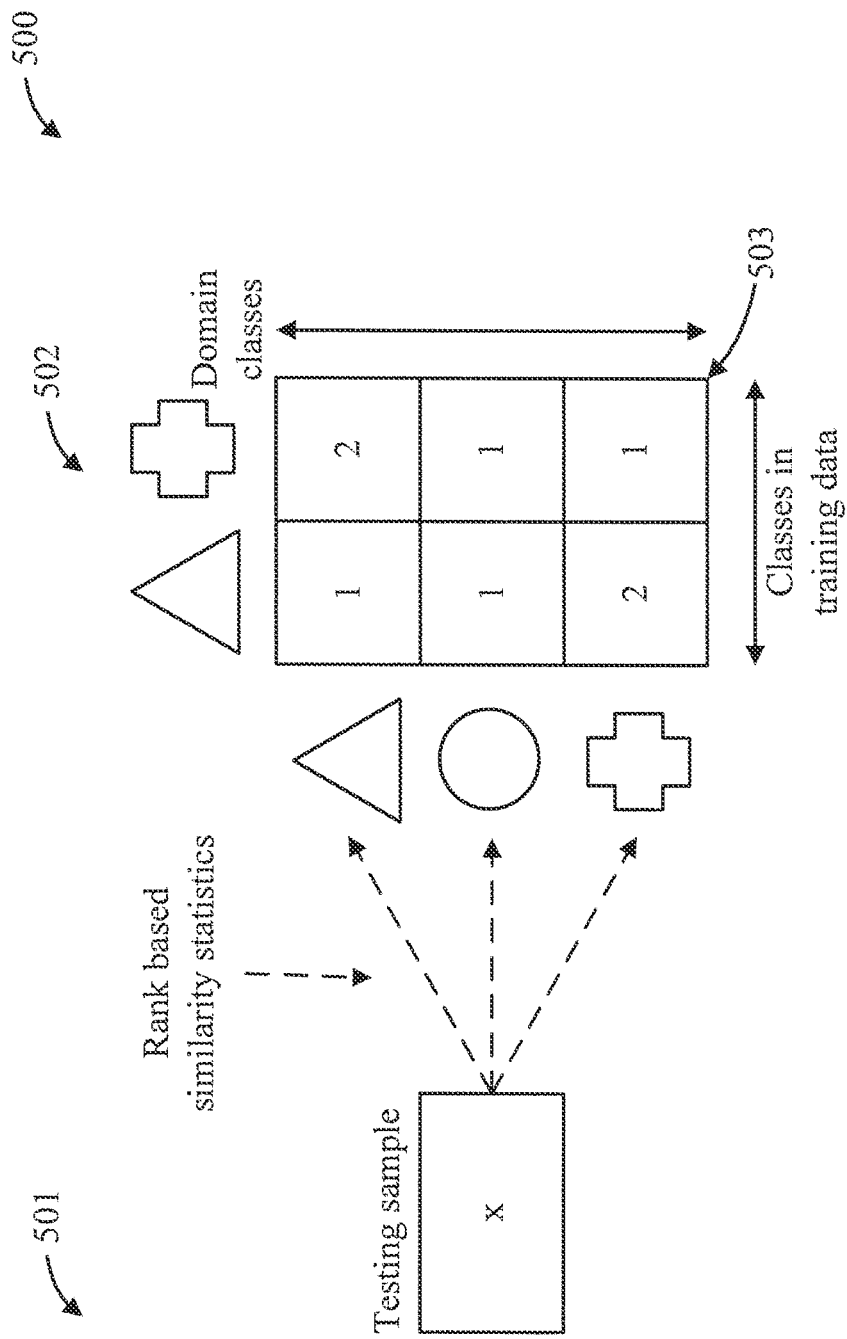
FIG. 5 is a block diagram showing an exemplary distance computation for samples, in accordance with an embodiment of the present invention.

FIG. 5 is a block diagram having a testing sample in the left portion 501 and classes in training data and domain classes in the right portion 502.

Regarding FIG. 5, the left portion 501 shows for a testing sample x, distances are computed in feature space to the center of corresponding clusters for every class presented in the training data. Further regarding FIG. 5, the right portion 502 shows that for every class in the domain (rows), the distance $D_y(\bullet, \bullet)$ to every class presented training data (not in a feature space) is computed. Numbers in the heat-map 503 correspond to the rank of distances, and not distances themselves. Rank based similarity statistics are used between the left portion 501 and the right portion 502 to prescribe a class to a testing sample.

If $s_1 \in N$ or $s_2 \in N$, i.e., one class is missing class, then we propose to use a hypothesis test, which is described below.

Hypothesis test. Consider the case for a testing sample $x^{te}$, the two most similar classes (based on results of previous section) are $y_n$ (non missing from the training data class), and $y_m$ (missing class). Now it has to be decided which class is more likely to be a true label for $x^{te}$, given that the feature space $f(\bullet)$ does not have explicit information about the center of the cluster for missing label $y_m$. It is proposed to consider the problem as an outlier detection. Given learned features of a training data $f(x_i^{tr}), \forall i: y(x_i^{tr}) = y_n$, it is identified whether $f(x^{te})$ is an outlier and should belong to class $y_m$. Usually in Neural Networks, the encoder generates a high dimensional feature space with no explicit assumptions on the distribution of the data, which makes outlier detection on raw feature space very sensitive. A common approach in a high dimensional scenario is to perform one of the dimensional reduction techniques with further analysis or conduct a distance-based approach. Following the motivation behind distance-based approaches, it is proposed to perform the non-parametric hypothesis test.

A description will now be given regarding decreasing number of false positives and false negatives given nature of time-series data, in accordance with an embodiment of the present invention.

From the nature of hypothesis test, probability of type 1 error is bounded by $\alpha$, which means that on average we will prescribe $\alpha$ % of wrong classes, resulting in $\alpha$ % false positives. However, quite common in time series problems we can assume that there is a window, during which values of time series do not change. For example, when sensors monitor human activity, it can be assumed that the person keeps the same state for a period of time, e.g., sitting or running. This information can be used to decrease the number of false positives by recovering non-missing classes $y_n$, which were assigned as missing, and decrease false negatives by recovering missing classes $y_m$, which were assigned as non-missing. One of the ways to do it is using majority rule. That is, given set of predicted values, for every label in the window, we assign the most common in this window. The drawback of such approach is an extra parameter, window size. Usually it can be assigned from prior knowledge about the system or inferred with offline algorithms for change-point detection ( ). However, experiments show that even with small window we have significant improvement of results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for time series classification of missing labels, comprising:
    extracting a feature of an incoming time series segment to be classified during an inference stage;
    computing, by a hardware processor using a neural network model trained on training data, rank-based statistics of the feature to attempt to select two candidate labels from the training data that the incoming time series segment most likely belongs to;
    classifying the incoming time series segment using k-NN-based classification applied to the training data, responsive to the two candidate labels being present in the training data;
    classifying the incoming time series segment by hypothesis testing, responsive to only one of the two candidate labels being present in the training data;
    classifying the incoming time series segment into a class with higher values of the rank-based statistics from among a plurality of classes with different values of the rank-based statistics, responsive to none of the two candidate labels being present in the training data; and
    correcting a prediction by an applicable one of the classifying steps by majority voting with time windows.

2. The computer-implemented method of claim 1, further comprising training a neural network model on the training data based on ordinal quadruplet loss.

3. The computer-implemented method of claim 2, wherein the ordinal quadruplet loss comprises a similarity component, a discrimination component, and a feature order component with respect to a feature space.

4. The computer-implemented method of claim 2, wherein the ordinal quadruplet loss comprises a triplet loss and a log ratio loss.

5. The computer-implemented method of claim 1, further comprising computing, for each of the two candidate labels a label retrieval vector from the each of the two candidate labels to each of present labels of the original data.

6. The computer-implemented method of claim 1, further comprising computing, for each incoming times series to be classified during the inference stage, a test retrieval vector from each of the two candidate labels to a feature center of each of present labels in a feature space.

7. The computer-implemented method of claim 6, wherein the feature center is computed as an average of features of incoming time series segments having a same label.

8. The computer-implemented method of claim 1, wherein the hypothesis testing comprises determining outliers for a missing class using statistical methods.

9. The computer-implemented method of claim 8, wherein determining outliers comprises determining a distribution of distances from the training data in present classes to a class center of an evaluated class with respect to a threshold distance.

10. The computer-implemented method of claim 1, wherein said detecting step comprises making label predictions within a window of time using a majority voting scheme that selects a most predicted class during the window of time.

11. The computer-implemented method of claim 1, further comprising replacing an impending failing workplace machine with a backup workplace machine responsive to the prediction to avoid system downtime.

12. A computer program product for time series classification of missing labels, the computer program product comprising a non-transitory computer readable storage medium having program instructions embodied therewith, the program instructions executable by a computer to cause the computer to perform a method comprising:
   extracting, by a hardware processor, a feature of an incoming time series segment to be classified during an inference stage;
   computing, by the hardware processor using a neural network model trained on training data, rank-based statistics of the feature to attempt to select two candidate labels from the training data that the incoming time series segment most likely belongs to;
   classifying, by the hardware processor, the incoming time series segment using k-NN-based classification applied to the training data, responsive to the two candidate labels being present in the training data;
   classifying the incoming time series segment by hypothesis testing, responsive to only one of the two candidate labels being present in the training data;
   classifying the incoming time series segment into a class with higher values of the rank-based statistics from among a plurality of classes with different values of the rank-based statistics, responsive to none of the two candidate labels being present in the training data; and
   correcting a prediction by an applicable one of the classifying steps by majority voting with time windows.

13. The computer program product of claim 12, wherein the method further comprises training a neural network model on the training data based on ordinal quadruplet loss.

14. The computer program product of claim 13, wherein the ordinal quadruplet loss comprises a similarity component, a discrimination component, and a feature order component with respect to a feature space.

15. The computer program product of claim 13, wherein the ordinal quadruplet loss comprises a triplet loss and a log ratio loss.

16. The computer program product of claim 12, wherein the method further comprises computing, for each of the two candidate labels a label retrieval vector from the each of the two candidate labels to each of present labels of the original data.

17. The computer program product of claim 12, wherein the method further comprises computing, for each incoming times series to be classified during the inference stage, a test retrieval vector from each of the two candidate labels to a feature center of each of present labels in a feature space.

18. The computer program product of claim 17, wherein the feature center is computed as an average of features of incoming time series segments having a same label.

19. The computer program product of claim 12, wherein the hypothesis testing comprises determining outliers for a missing class using statistical methods.

20. A computer processing system for time series classification of missing labels, comprising:
   a memory device for storing program code; and
   a hardware processor operatively coupled to the memory device for storing the program code to
      extract a feature of an incoming time series segment to be classified during an inference stage;
      compute, using a neural network model trained on training data, rank-based statistics of the feature to attempt to select two candidate labels from the training data that the incoming time series segment most likely belongs to;
      classify the incoming time series segment using k-NN-based classification applied to the training data, responsive to the two candidate labels being present in the training data;
      classify the incoming time series segment by hypothesis testing, responsive to only one of the two candidate labels being present in the training data;
      classify the incoming time series segment into a class with higher values of the rank-based statistics from among a plurality of classes with different values of the rank-based statistics, responsive to none of the two candidate labels being present in the training data; and
      correct a prediction by an applicable one of the classifying steps by majority voting with time windows.

* * * * *